United States Patent
Dolphin et al.

(10) Patent No.: US 6,487,636 B1
(45) Date of Patent: Nov. 26, 2002

(54) METHOD AND APPARATUS FOR MAPPING DATA IN A HETEROGENEOUS DISK ARRAY STORAGE SYSTEM

(75) Inventors: Wade A. Dolphin, Eagle, ID (US); Bryan M. Diamond, Meridian, ID (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/556,221

(22) Filed: Apr. 24, 2000

(51) Int. Cl.[7] .......................... G06F 11/16; G06F 11/10
(52) U.S. Cl. .................. 711/114; 714/5; 714/6; 714/7
(58) Field of Search ................ 707/200; 711/114, 711/112, 111; 714/5, 6, 7

(56) References Cited

U.S. PATENT DOCUMENTS 5,664,187 A * 9/1997 Burkes et al. .............. 707/200
5,696,934 A * 12/1997 Jacobson et al. ............. 714/5

OTHER PUBLICATIONS

Rosch, Winn L. The Winn L. Rosch Hardware Bible, 3rd ed., 1994. pp. 994–995 and 999. Sam's Publishing.*

* cited by examiner

Primary Examiner—B. James Peikari
(74) Attorney, Agent, or Firm—Matthew L. Wade (57) ABSTRACT

A RAID data storage system includes a heterogenous disk array coupled to a controller. The disk array provides a storage space that includes a first set of stipes each having at least "N" blocks and a second set of stripes each having less than "N" blocks. The controller can operate to map the storage space into redundant units by creating at least one redundant unit for storing data according to a mirror redundancy scheme. The redundant unit includes a block from the first set of stripes and a block from the second set of stripes.

21 Claims, 10 Drawing Sheets

METHOD AND APPARATUS FOR MAPPING DATA IN A HETEROGENEOUS DISK ARRAY STORAGE SYSTEM

BACKGROUND OF THE INVENTION

Computer systems are constantly improving in terms of processing speed and reliability. As these systems improve, demands for improvements in mass storage systems in terms of I/O performance, availability and storage capacity also increase. In order to address these demands, RAID storage systems have been developed. RAID is an acronym that originally stood for "Redundant Arrays of Inexpensive Disks". Today, the "I" in RAID commonly stands for "independent".

Standard RAID systems improve I/O performance by a technique known as "disk striping". In order to enable disk striping (on a block level), the storage capacity of the array is grouped into a set of stripes. Each stripe consists of a set of single addressable units, known as blocks, which have the same physical row address. Disk striping allows the disk array to be treated as single logical disk and improves I/O performance as it permits parallel access of disks in the array. For purposes of this document, a block used to store user data may be referred to herein as a "user block". A block used to store parity data may be referred to herein as a "parity block".

RAID systems improve availability by using one or more data redundancy schemes wherein user data, or relationships among user data, are stored on multiple disks. This is done so that in the event of certain failures, user data is not lost. The data redundancy schemes may be categorized into two groups. The first group may be referred to herein as "mirror redundancy schemes". For purposes of this document, a "mirror redundancy scheme" is any redundancy scheme wherein user blocks are duplicated (at least once) and stored in multiple locations of the storage system. This group, therefore, includes RAID level 1 and triple mirror redundancy (triple mirror). According to RAID level 1, each user block is duplicated once. If one user block is lost, the duplicate block can be used to recover it. According to triple mirror redundancy each user block is duplicated twice.

The second group may be referred to as "parity redundancy schemes". For purposes of this document, a parity redundancy scheme is any redundancy scheme wherein one or more parity blocks are generated from a given set of user blocks. This is done so that if one of the user blocks from the set becomes lost, the other user blocks and the one or more parity blocks can be used to recover it. This group, therefore, includes RAID level 5 and RAID level 6. For example, in a conventional RAID 5 system, each stripe includes multiple blocks of user data and one parity block. In the event one block in the stripe is lost (e.g., due to a disk failure), the rest of the blocks in the stripe can be used to recover it.

There is a continuing need for improvements in RAID systems in terms of I/O performance, reliability and storage costs in order to keep pace with evolving computer systems.

SUMMARY OF THE INVENTION

Briefly, and in general terms, a method according to one embodiment of the invention is provided for mapping a data storage space provided by a disk array into redundant units. The data storage space being comprised of a first and a second set of stripes, the first set of stripes each having at least "N" blocks and the second set of stripes each having less than "N" blocks. The method includes creating at least a first redundant unit for storing data according to a mirror redundancy scheme, such as RAID level 1 or triple mirror. The first redundant unit includes a block from the first set of stripes and a block from the second set of stripes. The method may also include creating a second redundant unit for storing data according to a parity redundancy scheme, such as RAID level 5 or RAID level 6. The second redundant unit includes all the blocks from a first stripe from the first set of stripes. Preferably, N is equal to three if the mirror redundancy scheme is RAID level 1 and the parity redundancy scheme is RAID level 5.

The present invention may also be implemented as a data storage system. The data storage system includes a disk array providing a storage space. The storage space including a first set of stripes each having at least "N" blocks and a second set of stripes each having less than "N" blocks. In addition, the data storage system further includes a controller which is connected to the disk array. The controller is operable to map the storage space into redundant units by creating at least a first redundant unit. The first redundant unit includes a block from the first set of stripes and a block from the second set of stripes. The controller further operates to designate the first redundant unit to store data according to a mirror redundancy scheme, such as RAID level 1 or triple mirror.

In the addition, the controller may further operate to map the storage space by creating at least a second redundant unit for storing data according to a parity redundancy scheme. The second redundant unit including all the blocks from a first stripe. The first stripe being from the first set of stripes. The controller mal also operate to receive I/O requests from an external host computer and to perform read and write operations upon the disk array in response to the I/O requests.

In one specific implementation of the data storage system, the mirror redundancy scheme is RAID level 1, the parity redundancy scheme is RAID level 5 and N is equal to 3. In another specific implementation, the mirror redundancy scheme is RAID level 1, the parity redundancy scheme is RAID level 6 and N is equal to 5. In yet another specific implementation, the mirror redundancy scheme is triple mirror, the parity redundancy scheme is RAID level 6 and N is equal to 4.

The present invention may also be implemented as a program storage medium readable by a computer, tangibly embodying a program of instructions executable by the computer to perform steps for mapping a data storage space provided by a disk array into redundant units. The data storage space includes a first and a second set of stripes, the first set of stripes each having at least a pre-determined number of blocks and the second set of stripes each having less than the pre-determined number of blocks include mapping a first block form a first stripe and a second block from a second stripe so as to create a single redundant unit for storing data according to a mirror redundancy scheme. The first stripe being from the first set of stripes and the second stripe being from the second set of stripes. Preferably, the mirror redundancy scheme is selected from a list including RAID level 1 and triple mirror. In one specific implementation, the mirror redundancy scheme is RAID level 1 and the predetermined number is equal to three.

The method steps may also include mapping each block from a second stripe so as to create a second redundant unit for storing data according to a parity redundancy scheme, the second stripe being from the first set of stripes. The parity redundancy scheme may be selected from a list including RAID level 5 and RAID level 6. In one specific implementation, the mirror redundancy scheme is RAID level 1, the parity redundancy scheme is RAID level 5 and the predetermined number is equal to three.

Other aspects and advantages of the present invention will become apparent from the following detailed description, taken in conjunction with the accompanying drawings, illustrating by way of example the principles of the present invention.

DESCRIPTION OF THE DRAWINGS

Preferred embodiments of the invention are described below with reference to the following accompanying drawings, wherein.

DETAILED DESCRIPTION OF THE INVENTION

For purposes of this document, a "homogeneous disk array" is a disk array which employs disks of equal storage capacity. A "heterogenous" disk array is a disk array wherein two or more disks are of unequal storage capacity. Additionally, the "storage efficiency" of a disk array refers to the total number of blocks allocated to store user data divided by the total number of blocks in the array.

One problem encountered in the design of a RAID system concerns how to map the storage space provided by the system into "redundant units". For purposes of this document, a "redundant unit" refers to any set of associated blocks which is used to store data according to a particular data redundancy scheme. For example, a redundant unit used to store data according to RAID level 1 (RAID 1 unit) consists of two blocks. The first block being the duplicate of the other. A redundant unit used to store data according to RAID level 5 (RAID 5 unit) consists of a set of user blocks and a single parity block. The single parity block is generated from the set of user blocks.

The problem of mapping the storage space provided by a homogenous disk arrays is less troublesome as compared to heterogenous disk arrays. Unfortunately, conventional procedures to map the storage space in a heterogenous disk arrays can fail to completely utilize the available storage space that exceeds the capacity of the smallest disk in the array. As will be shown in the following exemplary embodiment, the present invention provides disk arrays that employ a mapping procedure that can maximize the use of this previously unallocated storage space so as to improve performance and availability without increasing storage costs.

Figure 1:
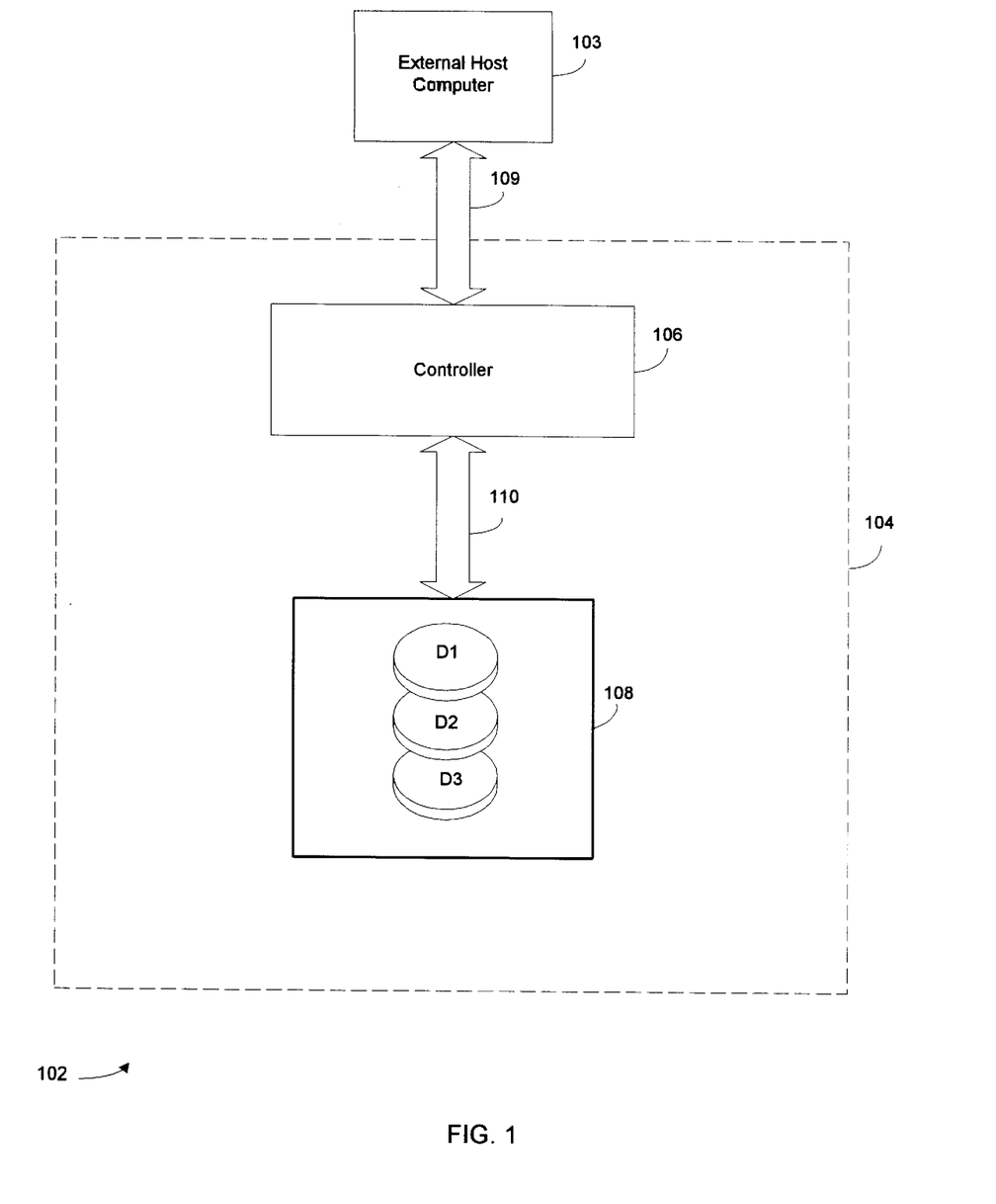
FIG. 1 shows a simplified and high level block diagram of a computing system which incorporates a first illustrative embodiment of the invention.

FIG. 1 shows a simplified and high level block diagram of a computing system 102 which incorporates a first illustrative embodiment of the invention. The computing system 102 includes a host computer 103 and a data storage system, RAID system 104. The RAID system 104 provides the computing system with mass storage capability.

The RAID system 104 includes a controller 106 and a heterogenous disk array 108. The controller 106 is connected to the host computer 103 via a first communication link 109 and to the disk array 108 via a second communication link 110. Both of these links may represent any suitable communication path. For example, the first communication link 109 may represent a local area network (LAN). The second communication link 110 may represent a small computer system interface (SCSI). The disk array 108 includes a collection of disks (D1–D3) for storing data. Also, the disk array 108 includes various conventional components, such as read/write heads, drive motors and data buffers.

In operation, the controller 106 can receive I/O commands from the host computer 103 over the communication link 109 in a standard manner. In response to these I/O commands the controller 106 can read and write data to the disks in the disk array 108 by sending appropriate control and data signals to the disk array 108 over the second communication link 110. As will be described in detail below, the controller 106 is capable of writing data according to a RAID 1 and a RAID 5 data redundancy scheme.

Figure 2:
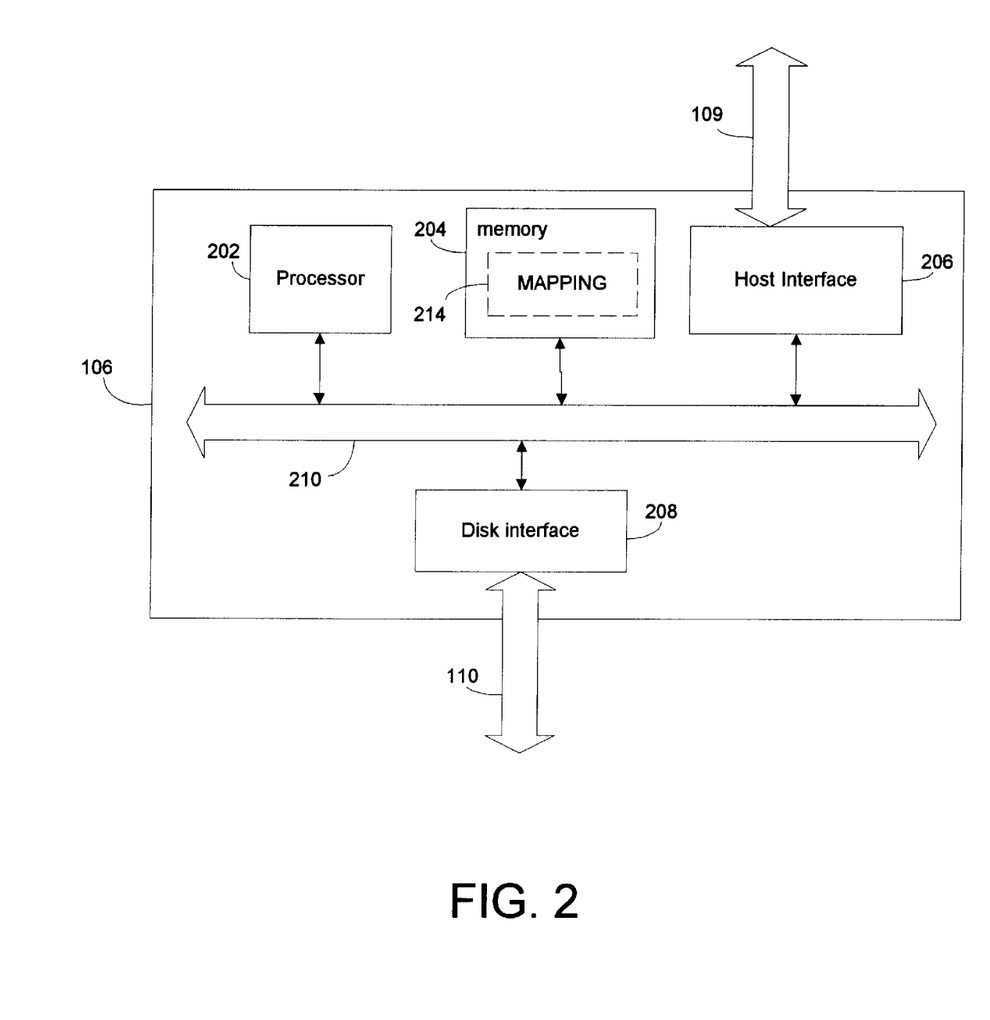
FIG. 2 is a simplified and high level schematic of a controller for controlling a disk array.

FIG. 2 is a simplified and high level schematic of the controller 106. As shown, the controller 106 includes a processor 202, a memory 204, a host interface 206 and a disk interface 208 all connected via a local bus 210. It is noted that each of these components may in fact include multiple devices. For example, the memory 204 may include one or more read only memories (ROM) and one or more random access memories (RAM). Additionally, the local bus 210 may include one or more data buses with accompanying control buses. As indicated, the host interface 206 provides the controller 106 with an interface to the host computer 103 (via the communication link 109). The disk interface 208 provides an interface to the disk array 108 (via the second communication link 110).

The processor 202 operates to execute various firmware programs stored in the memory 204. Many of these programs may be standard and enable the controller 106 to perform the various functions mentioned above. For example, one or more of these programs may enable the controller 106 to receive and to process I/O commands received from the host computer 103 over the host interface 206. Additionally, one or more of these programs enable the controller 106 to coordinate the transfer of data between the host computer 103 and the disk array 108 in response to these I/O commands.

Importantly, one of the programs stored in the memory 204 is a mapping program 214. The mapping program enables the controller 106 to perform a mapping function in order to map the storage space provided by the disks D1–D3 into RAID 1 and RAID 5 redundant units. The mapping function is accomplished in accordance with the principles of the present invention.

In general, the controller 106 performs the mapping function by first determining whether the storage space should be mapped according to a first or a second mapping algorithm.

In general, the controller 106 maps the storage space according to the second algorithm only if the following two relationships shown in table 1 are true.

TABLE 1

| | |
|---|---|
| Relationship #1: | RAID1_Units (second algorithm) > RAID1_UNITS (first algorithm) |
| Relationship #2: | STORAGE_EFF (second algorithm) ≥ STORAGE_EFF (first algorithm) |

Wherein,

"RAID1_UNITS (first algorithm)" is the number of RAID 1 redundant units created if the storage space is mapped according to the first algorithm.

"STORAGE_EFF (first algorithm)" is the storage efficiency of the array if the storage space is mapped according to the first algorithm;

"RAID1_UNITS (second algorithm)" is the number of RAID 1 redundant units created if the storage space is mapped according to the second algorithm; and "STORAGE_EFF (second algorithm)" is the storage efficiency of the array if the storage space is mapped according to the second algorithm.

Figure 3:
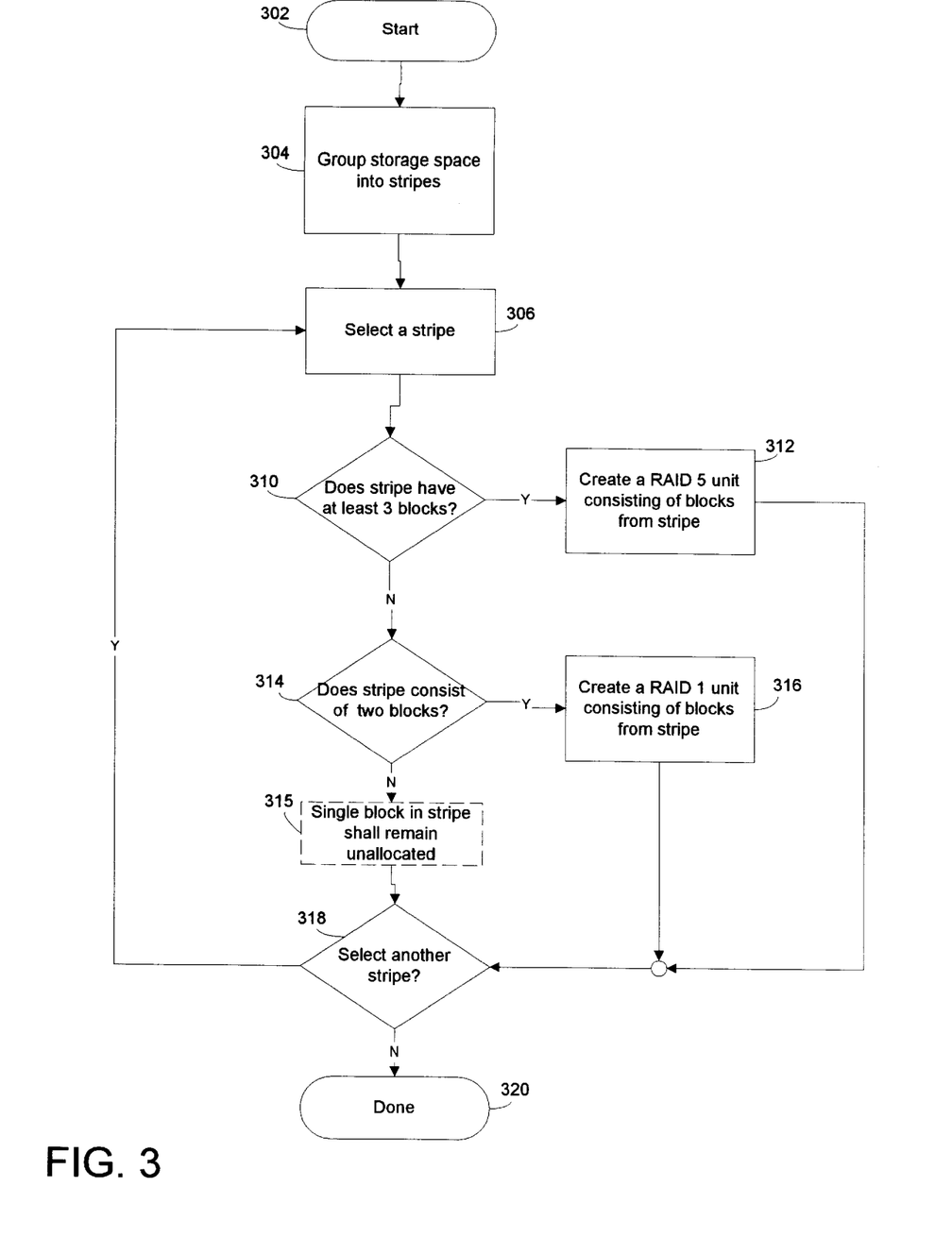
FIG. 3 is a flow diagram illustrating the logic of a first mapping algorithm which is incorporated into a mapping program stored in the controller memory.

Lets now consider the first mapping algorithm. FIG. 3 is a flow diagram illustrating the logic of the first mapping algorithm (which is incorporated into the mapping program 214). Referring now to FIG. 3, first the blocks in the storage space are grouped into a set of stripes (step 304). Then, a stripe is selected from the set for "processing" (step 306).

After a stripe is selected, the blocks from the stripe are mapped based upon the number of blocks in the stripe. This operation can be summarized by the following set of rules:

Rule #1: If the selected stripe has three or more blocks, then a single RAID 5 redundant unit is created consisting of all the blocks from the stripe (see step 310 and step 312);

Rule #2: If the selected stripe consists of only two blocks, then a single RAID 1 redundant unit is created consisting of the two blocks from the stripe (see step 314 and step 316);

Rule # 3. If the selected stripe consists of only one block, then that block shall remain unallocated (see step 315). That is, the block is not used to create a RAID 1 or a RAID 5 redundant unit.

After the selected stripe is processed as just indicated, a determination is then made as to whether one or more stripes still exist that have not yet been processed (decision step 318). If so, then another unprocessed stripe is selected and processed as just described. After all the stripes are processed, the mapping operation ends.

It is important to note that the first mapping algorithm may result in blocks being unallocated (see Rule #3). On a conceptual level, the second mapping algorithm may be thought of as way to utilize these unallocated blocks (under some circumstances) so as to create additional RAID 1 redundant units while maintaining the storage efficiency at the same value provided by the first algorithm (i.e., "STORAGE_EFF (first algorithm)".

Figure 4:
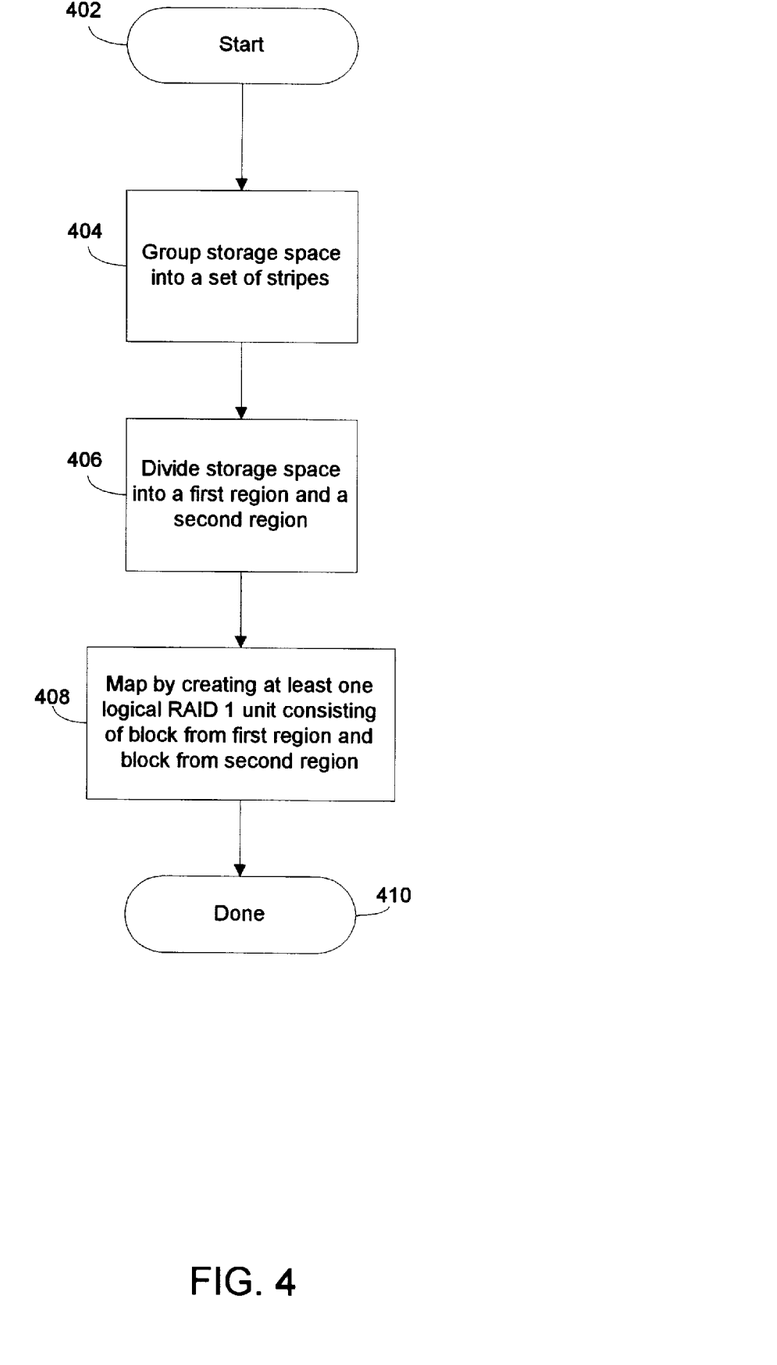
FIG. 4 is a flow diagram illustrating the logic of the second mapping algorithm which is also incorporated into the mapping program stored in the controller memory.

FIG. 4 is a flow diagram illustrating, in general terms, the logic of the second mapping algorithm. Referring now to FIG. 4, the first step is to group the storage space into a set of stripes (step 404). Then, the storage space is divided into the first and a second region (step 406). The first region consisting of the stripes that have at least three blocks and the second region consisting of the stripes that have less than three blocks. Thus, the first and second region can be characterized as follows:

The "first region" consists of the set of stripes that would be mapped into RAID 5 redundant units if the storage space is mapped under the first algorithm (see Rule #1).

The "second region" consists of the set of stripes that would be mapped into RAID 1 redundant units (see Rule #2) or be unallocated (see Rule #3) if the storage space is mapped under the first algorithm.

After the storage space is divided into first and second regions, it is then mapped by creating at least one "logical RAID 1 redundant unit" consisting of a block from the first region and a block from the second region (step 408). Importantly, this is done so as to achieve the relationships shown in Table 1.

For purposes of this document, a "logical redundant unit" is a redundant unit that includes blocks from two different stripes. A "logical RAID 1 redundant unit", therefore, includes two blocks each from a different stripe.

Now consider how the mapping function just described is applied to the physical storage space provided by disks D1–D3 in the present embodiment.

Figure 5:
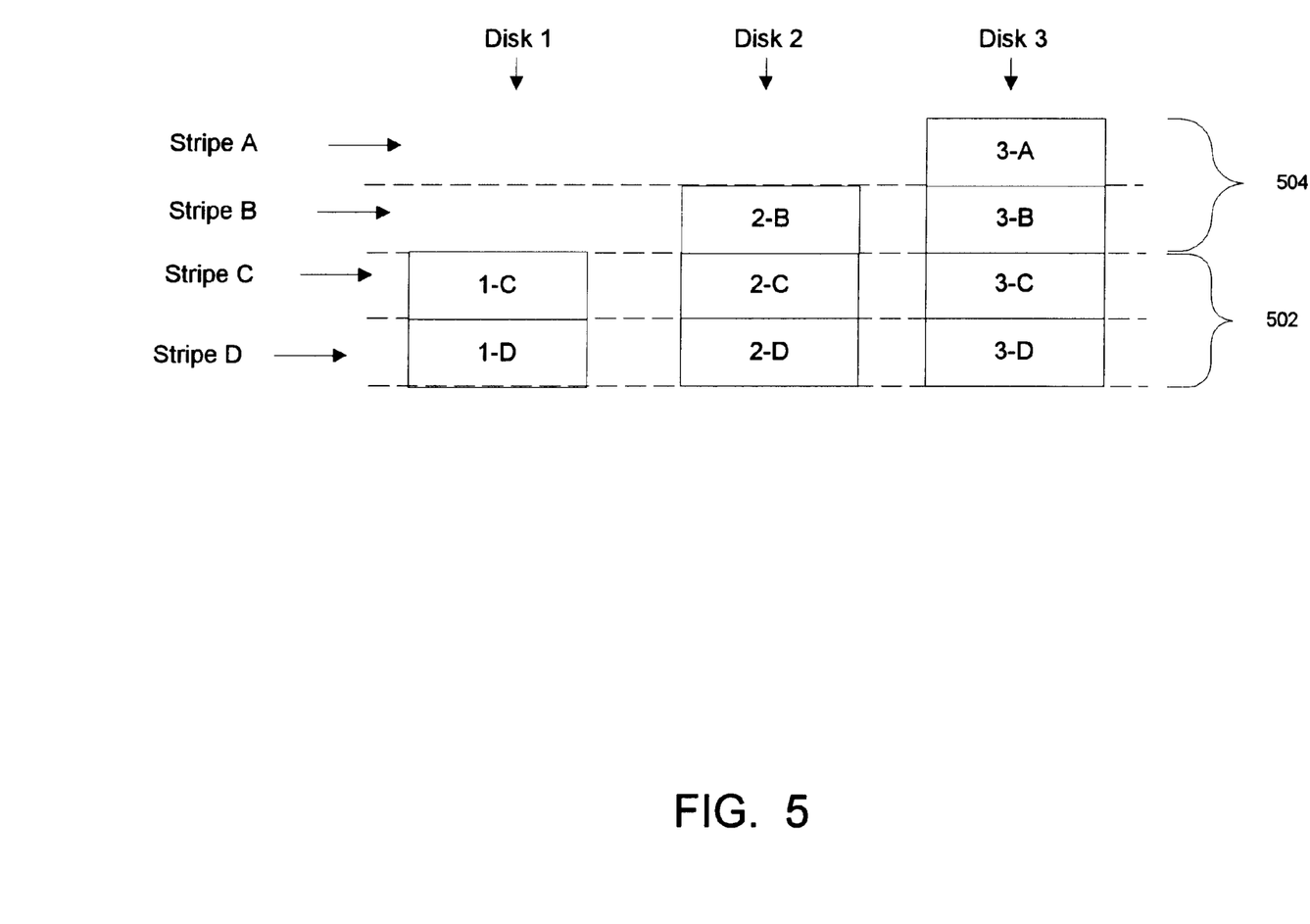
FIG. 5 shows, in diagrammatic form, the physical storage space provided by three disks in the disk array.

FIG. 5 shows, in diagrammatic form, the physical storage space provided by the three disks D1–D3. In this simplified example, the storage space includes only four stripes: stripe A, stripe B, stripe C and stripe D. Each block is designated as "X—X" which is used to indicate the stripe and the disk the block is from. Thus, the block designated as "1-C" is located on disk 1 and is part of stripe C.

Figure 6:
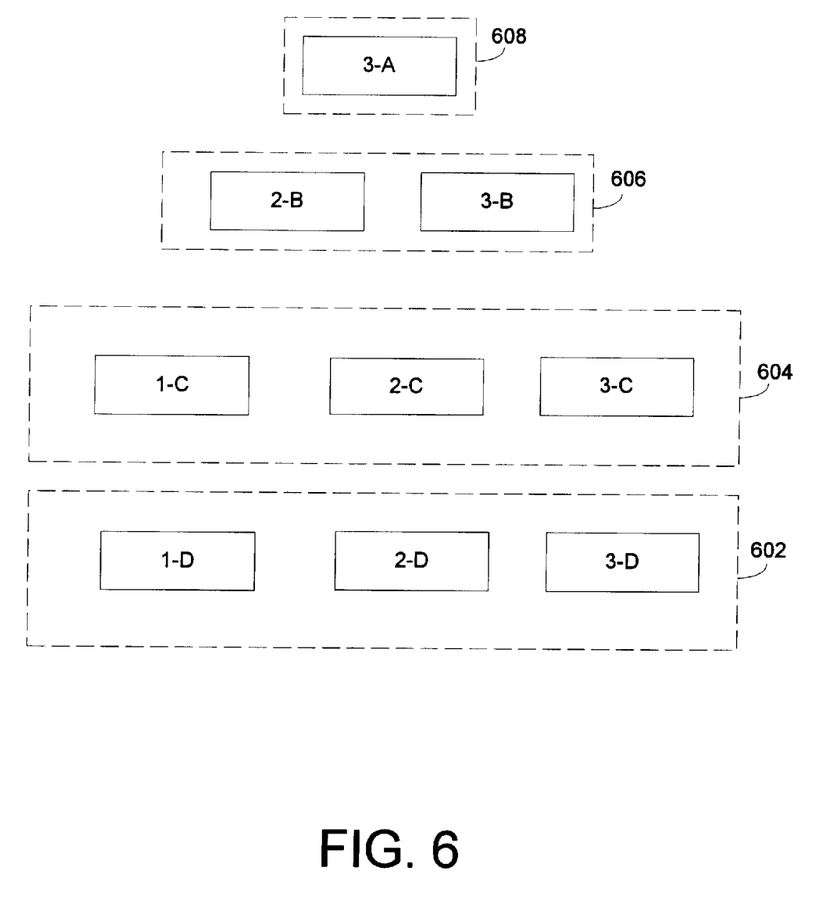
FIG. 6 illustrates how the storage space would be mapped under the first mapping algorithm.

As discussed above, the controller 106 operates to map the storage space according to the second algorithm only if the relationships indicated in table 1 are true. FIG. 6 illustrates how the storage space would be mapped under the first algorithm. As shown, under the first algorithm the storage space is mapped into two RAID 5 redundant units and one RAID 1 redundant unit. The first RAID 5 redundant unit consist of the blocks shown within box 602. The second RAID 5 redundant unit consists of the blocks shown within box 604. The RAID 1 redundant unit consists of the blocks within box 606. In addition, under the first algorithm one block would be unallocated. That block (block 3-A) is shown within box 608.

Thus, it can be seen from FIG. 6 that the values of "RAID 1_UNITS (first algorithm)" and "STORAGE_EFF (first algorithm)" are as follows:

RAID 1_UNITS (first algorithm)=1

STORAGE_EFF (first algorithm)≅55.6% (5 blocks available to store user data/9 total blocks)

Figure 7:
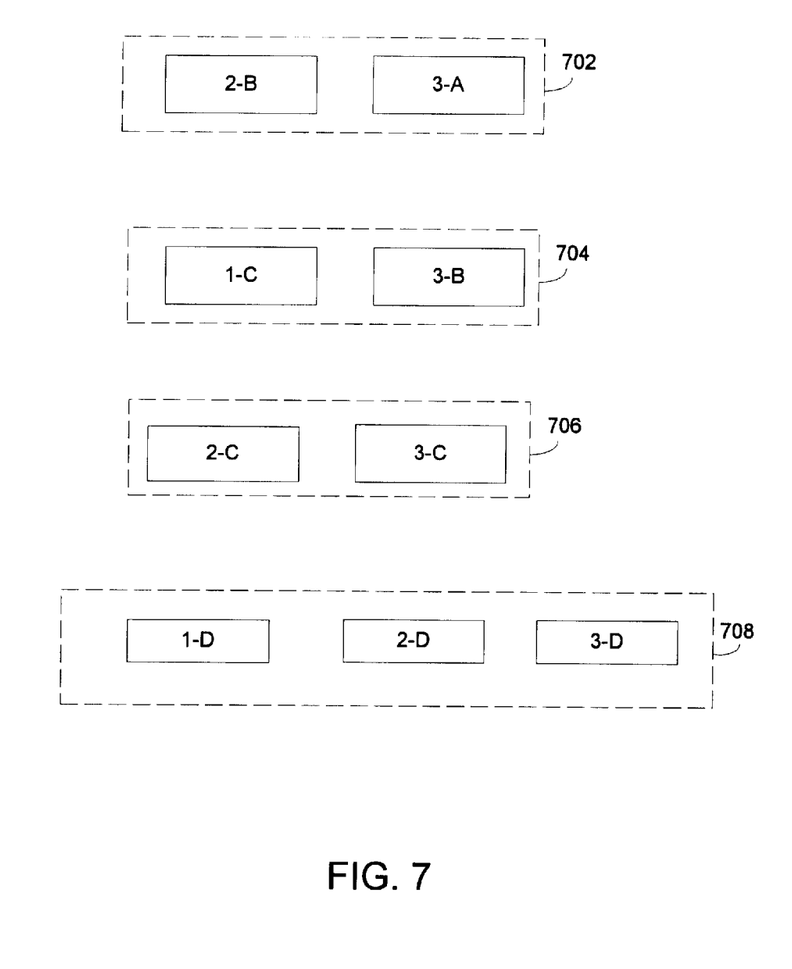
FIG. 7 illustrates how the storage space would be mapped according to one specific implementation of the second mapping algorithm.

FIG. 5 and 7 illustrates how the storage space is mapped under just one specific implementation of the second algorithm. As indicated in FIG. 5, step 406 is performed by logically dividing the storage space into a first region 502 and a second region 504. The first region 502 consisting of all stripes having at least three blocks. The second region 502 consisting of all stripes that have less than three blocks.

FIG. 7 illustrates how the storage space is mapped after performing step 408. As shown, three RAID 1 redundant units and one RAID 5 redundant unit is created. The first RAID 1 redundant unit consisting of the two blocks shown within box 702; the second RAID 1 redundant unit consisting of the two blocks shown within box 704; the third RAID 1 redundant unit consisting of the blocks shown within box

706. The RAID 5 redundant unit consists of the blocks shown within box 708.

Importantly, it can be seen that in accordance with step 408 the second RAID 1 redundant unit is a "logical RAID 1 redundant unit" consisting of a block (i.e., block 1-C) from the first region 502 and a block (i.e, block 3-B) from the second region 504.

Furthermore, it can also be seen from FIG. 7 that the following values are as follows:
  RAID 1_UNITS (second algorithm)=3
  Storage_EFF (second algorithm)≅55.6% (5 blocks available to store user data/9 total blocks)

Thus, in this case, it can be seen that the relationships provided in Table 1 are true. As a result, the controller 106 in the present embodiment operates to perform the mapping function by mapping the storage space as shown in FIG. 7.

From the foregoing, it will be appreciated that the present invention can be used to improve I/O performance and availability of RAID systems without increasing storage costs.

For example, some prior art RAID systems would map the storage space shown in FIG. 5 in accordance with first mapping algorithm. TABLE 2 compares the RAID system of the present embodiment to these particular prior art RAID systems.

TABLE 2

|  | Inventive RAID System | RAID System (according to prior art) |
| --- | --- | --- |
| Number of RAID 1 redundant units | 3 | 1 |
| Number of RAID 5 redundant units | 1 | 2 |
| Storage efficiency | ≅55.6% | ≅55.6% |

As can be seen by a person skilled in the art, because the inventive RAID system has more RAID 1 redundant units than the prior art RAID system, it is expected that the inventive RAID system will have higher I/O performance and availability as compared to the prior art RAID system. In addition, because the storage efficiencies are identical, the two RAID systems would be expected to have identical storage costs.

Figure 8:
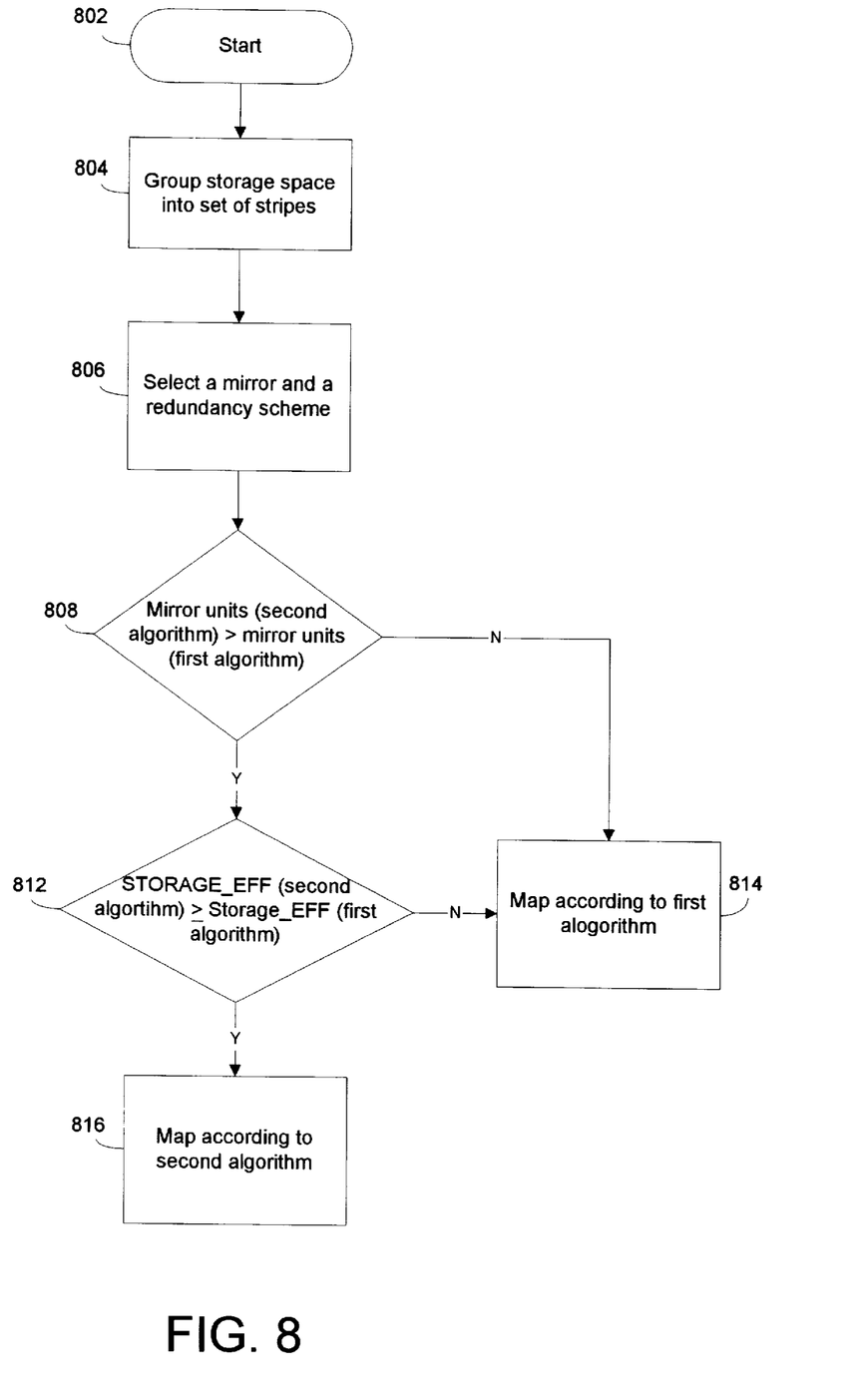
FIG. 8 is a flow diagram illustrating a second embodiment of the invention in the form of a general mapping procedure that can be followed to map the storage space in a heterogenous disk array into redundant units.

To illustrate other aspects of the invention, FIG. 8 is a flow diagram illustrating a second embodiment of the invention in the form of a general mapping procedure that can be followed to map the storage space in a heterogenous disk array into redundant units.

As shown in FIG. 8, first the storage space is grouped into a set of stripes (step 804). Next, a mirror and a parity redundancy scheme are selected for the mapping procedure (step 806). For ease of discussion, a redundant unit that stores data according to the selected mirror redundancy scheme is referred to as a "mirror unit". A redundant unit that stores data according the selected parity scheme is referred to as a "parity unit".

It is also noted that although any number of redundancy schemes may be selected in step 806 it is assumed that the selected mirrors scheme and the selected parity scheme can be compared in the following manner:
  1. The mirror redundancy scheme generally provides for higher I/O performance than the parity redundancy scheme.
  2. The mirror redundancy scheme provides higher availability than the parity redundancy scheme.
  3. A parity unit having "N" or more blocks will have a higher storage efficiency than a mirror unit with the same number of blocks. Where "N" is some threshold value that is dependant upon the particular parity and mirror redundancy scheme selected (See Table 4).

Next a determination is made as to whether to map the storage space according to a first or a second algorithm. Similar to the first embodiment, this decision is based upon whether the relationships shown in Table 3 are true.

TABLE 3

| Relationship #1: | MIRROR_Units (second algorithm) > MIRROR_UNITS (first algorithm) |
| --- | --- |
| Relationship #2: | STORAGE_EFF (second algorithm) ≧ STORAGE_EFF (first algorithm) |

Wherein,
  "MIRROR_UNITS (first algorithm)" is the number of mirror units created if the storage space is mapped according to the first algorithm;
  STORAGE_EFF (first algorithm) is the storage efficiency of the array if the storage space is mapped according to the first algorithm;
  "MIRROR_UNITS (second algorithm)" is the number of mirror units created if the storage space is mapped according to the second algorithm; and
  STORAGE_EFF (second algorithm) is the storage efficiency of array if the storage space is mapped according to the second algorithm.

If the relationships shown in Table 3 are not true (decision step 808 and decision step 812) then the storage space is mapped according to the first mapping algorithm (step 814). If, however, the relationships are true, then the storage space is mapped according to the second algorithm (step 816).

Figure 9:
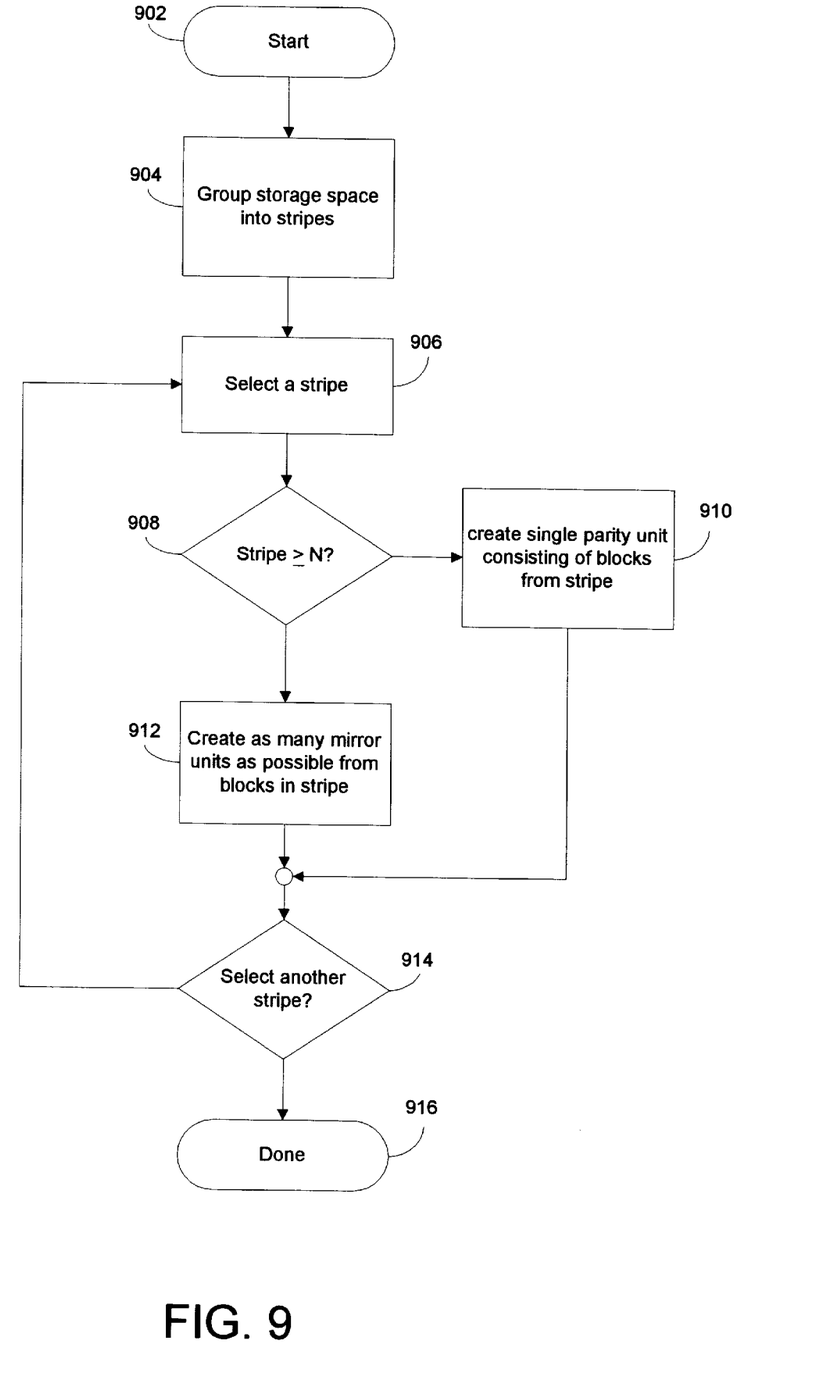
FIG. 9 is a flow diagram illustrating the steps of a first mapping algorithm according to the second embodiment.

FIG. 9 is a flow diagram illustrating the steps of the first algorithm. Referring now to FIG. 9, first the storage space is grouped into a set of stripes (step 904). Next, a stripe is selected from the set (step 906) for processing.

A determination is then made as to whether the stripe consists of at least "N" blocks (decision step 908). If so, then the blocks from the stripe are mapped into a single parity redundant unit (step 910). If not, then as many mirror units as possible are created from the blocks in the stripe (step 910).

After either step 908 or 910 is performed upon the selected stripe, a determination is made as to whether a stripe remains from the set of stripes that has not yet been selected (decision step 912). If so, then a previously unselected stripe is selected and the steps just described are repeated as indicated. After all the stripes are processed, the mapping procedure ends.

It is noted that similar to the first embodiment, the processing of each stripe according to the first mapping algorithm, is based upon the number of blocks in the stripe. Furthermore, the processing of a stripe can be summarized by the following set of rules:
  Rule #1: If the selected stripe has at least "N" blocks, then a single parity unit is created consisting of all the blocks from the stripe;
  Rule #2: If the selected stripe consists of less than N blocks, then as many mirror units as possible are created from the blocks in the stripe, leaving the rest of the blocks (if any) unallocated.

It is noted that, preferably, the value of N is selected so as to maximize the value of STORAGE_EFF (first algorithm) as well as to optimize the value of "MIRROR_UNITS (first algorithm)". For convenience, Table 4 provides the value of N that achieves this goal for several pairs of redundancy schemes that may be selected in step 804.

TABLE 4

| Mirror Redundancy Scheme | Parity Redundancy Scheme | N |
|---|---|---|
| Raid level 1 | Raid Level 5 | 3 |
| Raid level I | Raid level 6 | 5 |
| Triple mirror | Raid level 6 | 4 |

Thus, for example, if RAID level 1 and RAID level 5 are selected in step 804 it can be shown that Storage_EFF (first algorithm) is maximized and the value of "MIRROR_UNITS (first algorithm) is optimized if N is equal to three.

Figure 10:
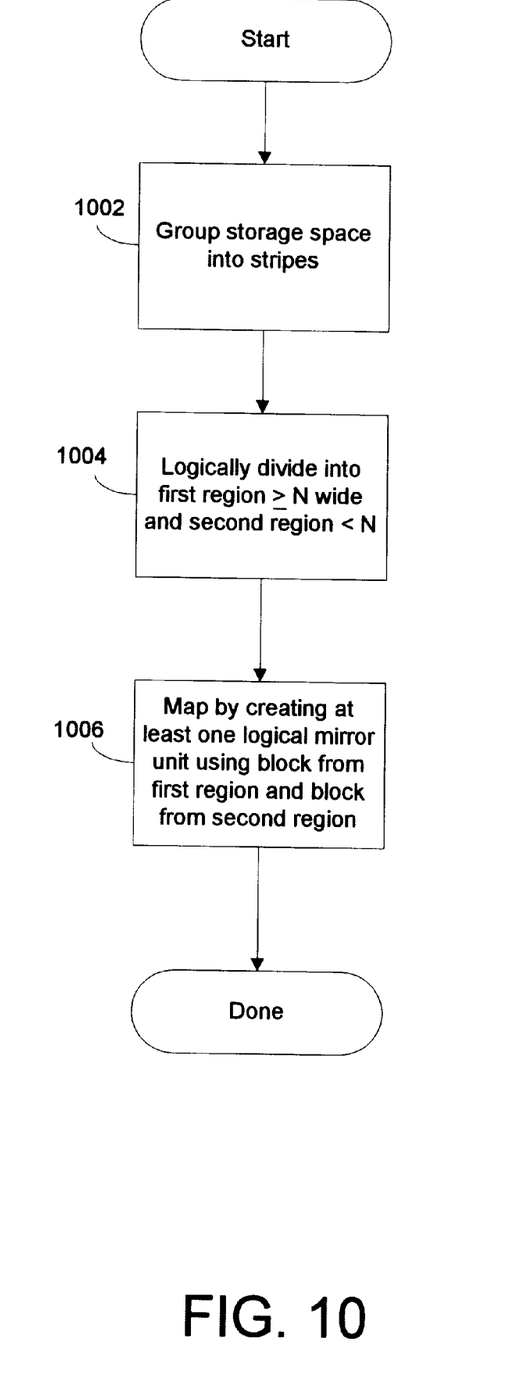
FIG. 10 is a flow diagram illustrating the steps in a second mapping algorithm according to the second embodiment.

Now consider the second algorithm. FIG. 10 is a flow diagram illustrating the steps in the second algorithm. Referring now to FIG. 10, the storage space is grouped into a set of stripes (step 1002). Next, the storage space is logically divided into two regions (step 1004). The first region including all stripes having less than N blocks. The second region consisting of the rest of the stripes having N or more than "N" blocks.

Next, the storage space is mapped by creating at least one logical mirror unit (step 1006). The logical mirror unit including a block from the first region and a block from the second region. Importantly, this is done so as to achieve the relationships shown in table 3.

Several observations can be made regarding the first and second algorithms just described. First, it can be seen that mapping the storage space according to the first algorithm can result in blocks being unallocated. These unallocated blocks will exist in the first region of stripes defined in the second algorithm. Second, the second algorithm can be a considered a mapping algorithm that can result in increasing the utilization of the first region in order to create at least one additional mirror unit which would not have been created by the first algorithm. As a result, higher I/O performance and availability is achieved. Importantly, this is accomplished so as not to decrease the storage efficiency that would be obtained had the first algorithm been used to map the storage space.

The present invention may also be embodied in the form a program storage medium having computer readable program code embodied therein for causing a computer to perform one or more of the steps indicated in the figures In the context of this document, "program storage medium" can be any means that can contain, store, communicate, propagate, or transport the program for use by or in connection with an instruction execution system, apparatus or device. The program storage medium can be, for example (the following is a non-exhaustive list), a magnetic, optical, or semiconductor based storage device.

Furthermore, while various embodiments of the present invention have been described above, it should be understood that they have been presented by way of example only, and are not intended to be limiting. For example, the invention has been described in the context of storage devices of the disk array type. It is understood, however, that the present invention can also be used to improve other types of storage devices. For example, the present invention may be used to provide other types of storage devices such as (the following is a non-exhaustive list) tape, optical or semiconductor based storage devices.

Thus, the breath and scope of the present invention should not be limited by any of the above described exemplary embodiments, but should be defined only in accordance with the following claims and their equivalents.

What is claimed is:

1. A method for mapping a data storage space into redundant units, the data storage space comprised of a first and a second set of stripes, the method comprising:
   (a) creating at least a first redundant unit for storing data according to a mirror redundancy scheme, the first redundant unit including a block from the first set of stripes and a block from the second set of stripes;
   wherein the first set of stripes each having at least "N" blocks and the second set of stripes each having less than "N" blocks.

2. The method of claim 1, wherein the data storage space is provided by a disk array.

3. The method of claim 2, further comprising:
   (b) creating at least a second redundant unit for storing data according to a parity redundancy scheme, the second redundant unit including all the blocks from a first stripe from the first set of stripes.

4. The method of claim 3, wherein the mirror redundancy scheme is RAID level 1 and the parity redundancy scheme is RAID level 5.

5. The method of claim 4, wherein N is equal to three.

6. The method of claim 5, wherein step (a) is only performed if the second set of stripes includes at least one stripe having only one block.

7. The method of claim 3, wherein the mirror redundancy scheme is RAID level 1 and the parity redundancy scheme is RAID level 6.

8. The method of claim 3, wherein the mirror redundancy scheme is triple mirror and the parity redundancy scheme is RAID level 6.

9. A data storage system, comprising:
   (a) a disk array providing a storage space, the storage space including a first set of stripes each having at least "N" blocks and a second set of stripes each having less than "N" blocks;
   (b) a controller, connected to the disk array, operable to map the storage space into redundant units by creating at least a first redundant unit for storing data according to a mirror redundancy scheme, the first redundant unit including a block from the first set of stripes and a block from the second set of stripes.

10. The data storage system according to claim 9, wherein the controller further being operable to map the storage space by creating at least a second redundant unit for storing data according to a parity redundancy scheme, the second redundant unit including all the blocks from a first stripe, the first stripe being from the first set of stripes.

11. The data storage system according to claim 9, wherein the mirror redundancy scheme is RAID level 1, the parity redundancy scheme is RAID level 5 and N is equal to 3.

12. The data storage system according to claim 11, wherein the controller further being operable to receive I/O requests from an external host computer and to perform read and write operates upon the disk array in response to the I/O requests.

13. The data storage system according to claim 9, wherein the mirror redundancy scheme is RAID level 1, the parity redundancy scheme is RAID level 6 and N is equal to 5.

14. The data storage system according to claim 9, wherein the mirror redundancy scheme is triple mirror, the parity redundancy scheme is RAID level 6 and N is equal to 4.

15. The data storage system according to claim 9, wherein the controller further being operable to receive I/O requests from an external host computer and to perform read and write operations upon the disk array in response to the I/O requests.

16. A program storage medium readable by a computer, tangibly embodying program of instructions executable by the computer to perform steps for mapping a data storage space provided by a disk array into redundant units, the data storage space comprised of a first and a second set of stripes, the first set of stripes each having at least a pre-determined number of blocks and the second set of stripes each having less than the pre-determined number of blocks, the method steps comprising:

(a) mapping a first block form a first stripe and a second block from a second stripe so as to create a single redundant unit for storing data according to a mirror redundancy scheme, wherein the first stripe being from the first set of stripes and the second stripe being from the second set of stripes.

17. The program storage medium according to claim 16, wherein the mirror redundancy scheme is selected from a list including RAID level 1 and triple mirror.

18. The program storage medium according to claim 16, wherein the mirror redundancy scheme is RAID level 1 and the pre-determined number is equal to three.

19. The program storage medium according to claim 16, wherein the method steps further comprising:

(b) mapping each block from a second stripe so as to create a second redundant unit for storing data according to a parity redundancy scheme, the second stripe being from the first set of stripes.

20. The program storage medium according to claim 19, wherein the parity redundancy scheme is selected from a list including RAID level 5 and RAID level 6.

21. The program storage medium according to claim 19, wherein the mirror redundancy scheme is RAID level 1, the parity redundancy scheme is RAID level 5 and the predetermined number is equal to three.

* * * * *